United States Patent
Cakulev et al.

(10) Patent No.: US 12,342,269 B2
(45) Date of Patent: Jun. 24, 2025

(54) SYSTEMS AND METHODS FOR NETWORK SLICE MODIFICATION BY POLICY CONTROL FUNCTION IN A WIRELESS NETWORK

(71) Applicant: Verizon Patent and Licensing Inc., Basking Ridge, NJ (US)

(72) Inventors: Violeta Cakulev, Milburn, NJ (US); Sudhakar Reddy Patil, Flower Mound, TX (US); Lily Zhu, Parsippany, NJ (US); Gerardo S. Libunao, Manalapan, NJ (US); Deepa Jagannatha, Bridgewater, NJ (US); Raquel Morera Sempere, Weehawken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 374 days.

(21) Appl. No.: 17/816,522

(22) Filed: Aug. 1, 2022

(65) Prior Publication Data

US 2024/0040494 A1    Feb. 1, 2024

(51) Int. Cl.
*H04W 48/18*   (2009.01)
*H04W 24/10*   (2009.01)

(52) U.S. Cl.
CPC .......... *H04W 48/18* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 2022/0240173 A1* | 7/2022 | Wang | ..................... | H04W 48/18 |
| 2022/0303804 A1* | 9/2022 | Ha | ......................... | H04W 24/08 |
| 2022/0345996 A1* | 10/2022 | Jeong | ................ | H04W 28/0268 |
| 2024/0015591 A1* | 1/2024 | Gundavelli | ....... | H04W 28/0865 |
| 2024/0259932 A1* | 8/2024 | Lanev | ................... | H04W 48/16 |
| 2024/0260112 A1* | 8/2024 | Tiwari | .................. | H04W 76/18 |

OTHER PUBLICATIONS

Third Generation Partnership Project, "Technical Specification Group Services and System Aspects; System architecture for the 5G System (5GS); Stage 2 (Release 17)," 3GPP TS 23.501 V17.5.0 (Jun. 2022), 568 Pages.

Third Generation Partnership Project, "Technical Specification Group Core Network and Terminals; 5G System; Session Management Policy Control Service; Stage 3 (Release 17)," 3GPP TS 29.512 V17.7.0 (Jun. 2022), 255 Pages.

* cited by examiner

*Primary Examiner* — Lonnie V Sweet

(57) ABSTRACT

A system described herein may provide a technique for a policy and/or rules element of a core network, such as a Policy Control Function ("PCF"), to identify a first network slice with which a communication session between a User Equipment ("UE") and a core network, such as a protocol data unit ("PDU") session, is associated. The policy and/or rules element may identify a second network slice with which the communication session should be associated, such as based on traffic monitoring, network congestion monitoring, or other criteria, and may output an indication, indicating a second network slice, to a session control element, such as an Session Management Function ("SMF"). The session control element may cause the communication session to be moved from the first network slice to the second network slice based on receiving the indication.

20 Claims, 7 Drawing Sheets

US 12,342,269 B2

SYSTEMS AND METHODS FOR NETWORK SLICE MODIFICATION BY POLICY CONTROL FUNCTION IN A WIRELESS NETWORK

BACKGROUND

Wireless networks may offer connectivity to User Equipment ("UEs"), such as mobile telephones, Internet of Things ("IoT") devices, or other types of devices. The UEs may send or receive traffic via such networks in order to receive services such as voice call services, content streaming services, gaming services, and/or other services. The different services may have different Quality of Service ("QoS") or performance requirements, such as latency requirements, throughput requirements, etc. The wireless networks may utilize network slicing in order to deliver requisite levels of QoS, performance, etc. associated with such services, UE types or groups, and/or other criteria. Different network slices may, for example, be associated with different priority levels, QoS parameters, etc.

DETAILED DESCRIPTION OF EXAMPLE EMBODIMENTS

The following detailed description refers to the accompanying drawings. The same reference numbers in different drawings may identify the same or similar elements.

Embodiments described herein provide for a policy and/or rules element of a core network associated with a wireless network to initiate slice changes for communication sessions associated with particular UEs. For example, as discussed below, a Policy Control Function ("PCF") of a Fifth Generation ("5G") core ("5GC") may initiate the modification of a network slice with which a particular protocol data unit ("PDU") session (e.g., between a particular UE and the 5GC) is associated.

The initiation of slice modifications for communication sessions by the policy and/or rules element may provide additional flexibility and/or granular control over operation of the network, thereby improving overall network efficiency and performance. Further, the policy and/or rules element may be associated with interfaces with other network elements (e.g., a session control element, such as a Session Management Function ("SMF")) via which the policy and/or rules element may receive traffic attributes of user plane traffic (e.g., performance or other monitoring information, such as throughput, uptime or activity rate, etc.), congestion or load metrics associated with the network, and/or other information that may influence the determination of whether to modify an existing communication session (e.g., whether to modify the network slice with which the communication session is associated). Additionally, the policy and/or rules element may be associated with interfaces, application programming interfaces ("APIs"), etc. via which the policy and/or rules element may receive dynamically updated information specifying criteria, conditions, etc. based on which the policy and/or rules element may determine modifications to network slices of communication sessions.

Figure 1:
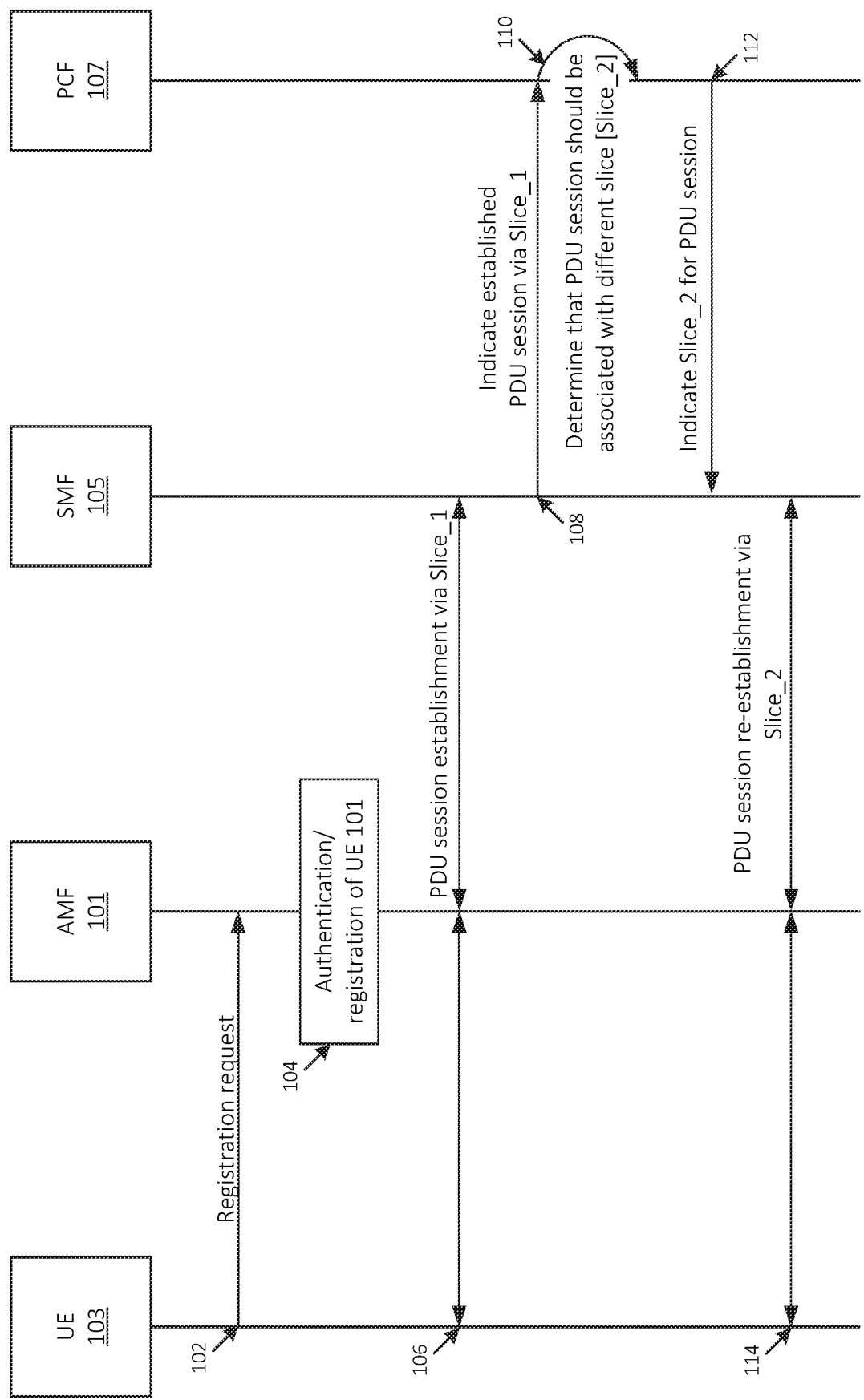
FIG. 1 illustrates an example overview of one or more embodiments described herein.

As shown in FIG. 1, for example, an access control element associated with a radio access network ("RAN") and/or a core network (e.g., Access and Mobility Management Function ("AMF") 101, in some embodiments) may receive (at 102) a registration request from a given UE 103. The registration request may be received, in some embodiments, via an N1 interface, Non-Access Stratum ("NAS") signaling, and/or other suitable protocols and/or interfaces. The registration request may include a request to establish a communication session between UE 103 and a core network. In some embodiments, the registration request may include a request for the communication session to be associated with a particular slice. For example, the registration request may include a Network Slice Selection Assistance Information ("NSSAI") value or other suitable value that indicates a network slice.

AMF 101 may authenticate and/or register (at 104) UE 103, which may include verifying that UE 103 is authorized to communicate with the core network. For example, AMF 101 may communicate with a UE information repository (e.g., a Unified Data Management function ("UDM"), Home Subscriber Server ("HSS"), etc.), which may include identifiers (e.g., Subscription Permanent Identifier ("SUPI") values, Globally Unique Temporary Identifier ("GUTI") values, Mobile Directory Numbers ("MDNs"), and/or other suitable identifiers) of UEs 103 that are authorized to communicate with the core network. The authentication and/or registration (at 104) of UE 103 may include one or more other operations that are not discussed in detail here, for the sake of brevity.

Assuming that UE 103 is authorized to communicate with the core network, AMF 101 may communicate with UE 103 and/or a session control element of the core network (e.g., SMF 105) in order to establish (at 106) a communication session between UE 103 and the core network. In some embodiments, the communication session may include a PDU session that is associated with a particular network slice. The network slice may be selected (e.g., by AMF 101 and/or SMF 105) based on a network slice included in the registration request (at 102) from UE 103 and/or based on one or more other criteria. In this example, the particular network slice is referred to as "Slice_1." In practice, the network slice may be referred to in some other manner, or may be associated with a different identifier or identifier format.

As further shown, SMF 104 may provide (at 108) an indication of the established communication session (e.g., PDU session) via the particular network slice (i.e., Slice_1, in this example) to a policy and/or rules element of the core network, such as PCF 107. For example, SMF 104 may provide (at 108) the indication via an N7 interface, via a Npcf_SMPolicyControl message (e.g., a Npcf_SMPolicyControl_Create message, a Npcf_SMPolicyControl_Update message, etc.), and/or in some other suitable manner. In some embodiments, in response to receiving the indication from SMF 105, PCF 107 may provide one or more rules, policies, etc. associated with UE 103 and/or otherwise associated with the established PDU session. In some embodiments, the rules, policies, etc. may be associated with QoS policies, filtering policies, and/or other suitable rules or policies to be applied to traffic sent to and/or from UE 103 via the established PDU session.

In accordance with some embodiments, PCF 107 may maintain information associating UE 103 and/or the established PDU session with the particular slice indicated (at 108) by SMF 105. Additionally, or alternatively, some other device or system may maintain such information. For example, SMF 105 may provide the indication to the other device or system, or PCF 107 may forward such information to the other device or system (e.g., based on receiving (at 108) the indication from SMF 105). In this manner, PCF 107 may maintain or otherwise access information, associated with numerous UEs 103 and/or PDU sessions associated with such UEs 103, indicating respective network slices that are associated with established PDU sessions.

Figure 2:
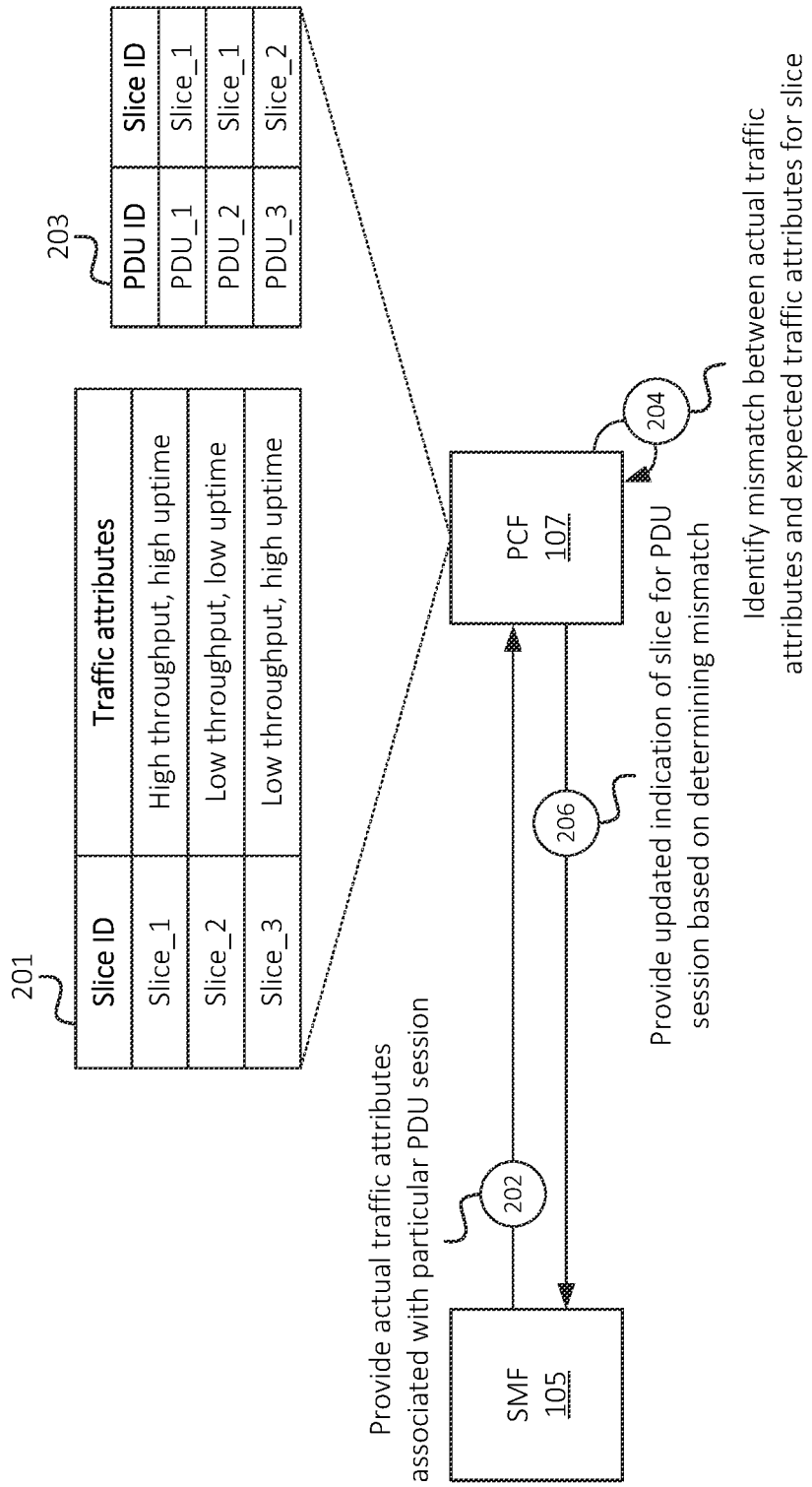
FIGS. 2 and 3 illustrate examples of determining network slices to which particular communication sessions should be moved, in accordance with some embodiments.
Figure 3:
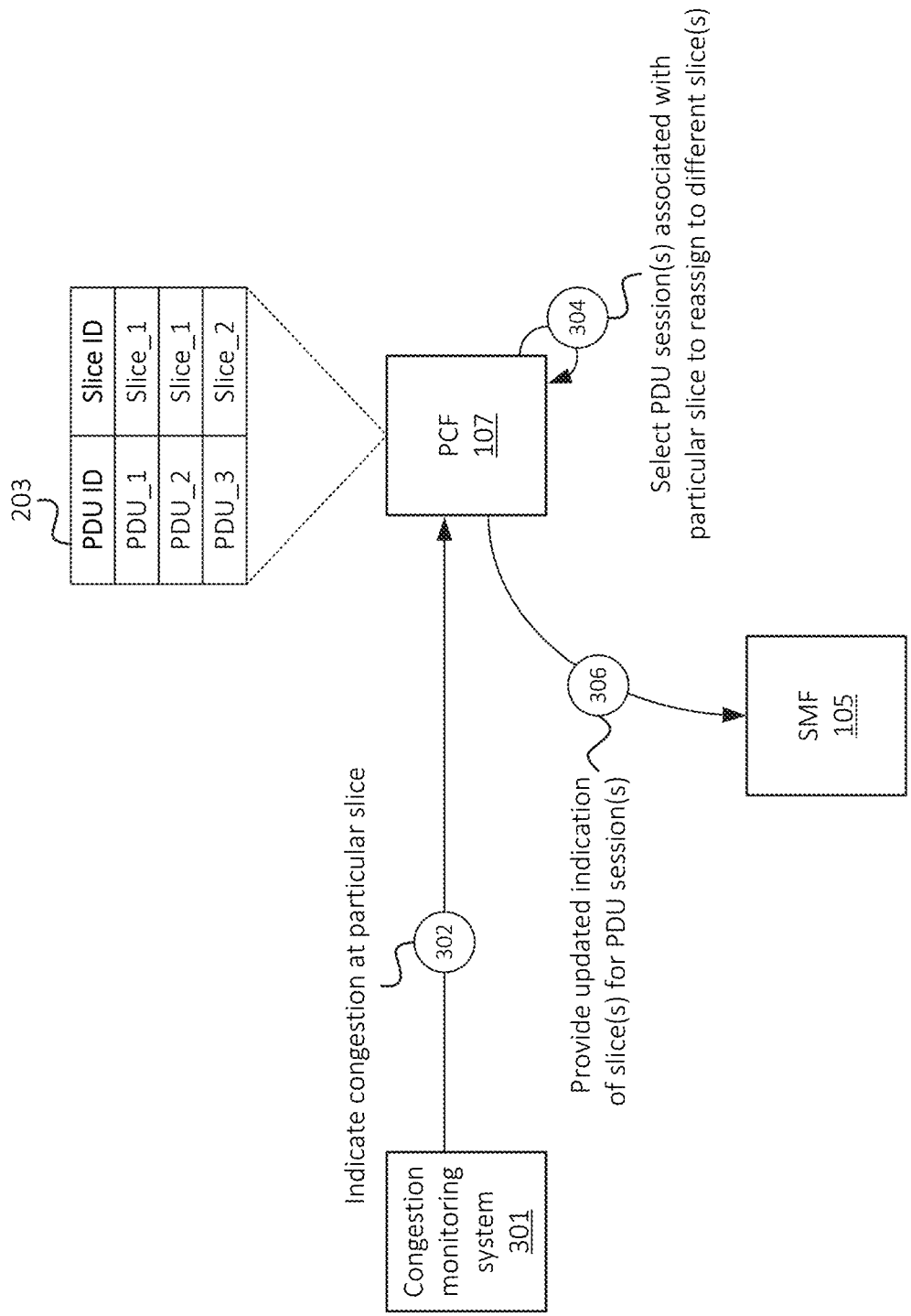

As further shown, in accordance with some embodiments, PCF 107 may determine (at 110) that the PDU session should be associated with a different slice than the slice indicated (at 108) by SMF 105. For example, PCF 107 may make such determination immediately or otherwise directly based on receiving the indication (at 108), and/or may make the determination at some later time based on one or more triggers, conditions, criteria, etc. FIGS. 2 and 3, discussed below, provide examples of such triggers, conditions, etc. Briefly, for example, such determination may be based on determining that UE 103 is not authorized for the particular slice, that one or more attributes of traffic that is sent via the PDU session do not match expected traffic attributes associated with the particular slice, network congestion associated with the particular slice, and/or other suitable triggers, conditions, etc.

In this example, assume that PCF 107 determines that the PDU session should be associated with "Slice_2" instead of Slice_1. For example, PCF 107 may maintain rules, conditions, etc. based on which PCF 107 may determine a more suitable network slice than the one indicated (at 108) by SMF 105, with which the PDU session is currently associated. PCF 107 may accordingly output (at 112) an indication of the selected slice (i.e., Slice_2, in this example) to SMF 105. PCF 107 may output the indication via an N7 interface, via a Npcf_SMPolicyControl message (e.g., a Npcf_SMPolicyControl_UpdateNotify message), and/or in some other suitable manner. The indication (provided at 112) may include a slice identifier of the selected slice in addition to or in lieu of other QoS-related information, such as a QoS Class Identifier ("QCI") value, a 5G QoS Identifier ("5QI") value, etc. Providing (at 112) the slice identifier may provide a degree of control to a network operator associated with the core network, inasmuch the network operator may be able specifically configure PCF 107 to indicate desired network slices for particular PDU sessions on the basis of attributes of user plane traffic sent via such PDU sessions (e.g., since SMF 105 and/or other core network functions may be able to analyze and provide such attributes to PCF 107). In contrast, QCI values, 5QI values, etc. may or may not have a direct correlation to network slices, and other functions (e.g., AMF 101) may not necessarily be able to analyze attributes of user plane traffic, network congestion metrics, etc., and may not accordingly be able to make network select determinations based on user plane traffic attributes, network congestion metrics, etc.

Based on receiving (at 112) the indication of the updated network slice for the PDU session, SMF 105, AMF 101, and/or UE 103 may communicate to re-establish (at 114) the PDU session according to the updated network slice (i.e., Slice_2, as opposed to Slice_1, in this example). For example, AMF 101, SMF 105, and/or UE 103 may tear down, de-establish, etc. the previously established (at 106) PDU session, and may establish a new PDU session according to the newly indicated network slice. In this manner, the PDU session may effectively be "moved" to a different network slice in a relatively seamless manner, and the moving of the PDU session may be initiated by PCF 107 (e.g., based on analysis of user plane traffic attributes, core network metrics, etc.).

As noted above, FIGS. 2 and 3 illustrate examples of a determination by PCF 107 that a given PDU session should be moved from one network slice to another. As shown in FIG. 2, for example, PCF 107 may maintain one or more data structures 201 and/or 203, which may be used to determine whether traffic sent via a given PDU session matches expected attributes. In some embodiments, PCF 107 may receive the information stored in data structures 201 and/or 203 from a network operator and/or from some other device or system that generates and/or maintains such information. In some embodiments, the information in data structure 201 may be generated, modified, refined, etc. via one or more artificial intelligence/machine learning ("AI/ML") techniques or other suitable modeling techniques.

Data structure 201 may include information associating particular network slices with particular traffic attributes. The traffic attributes are shown in FIG. 2 in a simplified manner, for the sake of explanation. For example, data structure 201 includes information indicating that Slice_1 is associated with high throughput and high uptime, that Slice_2 is associated with low throughput and low uptime, and Slice_3 is associated with low throughput and high uptime. Throughput may refer, for example, to an amount of traffic that is sent to and/or from (e.g., uplink and/or downlink user plane traffic) a given UE 103 via a given PDU session associated with a respective network slice over a given time window.

Uptime may refer to an activity rate or other indicator of how often traffic is "actively" sent via a given PDU session. For example, a "low" uptime may be associated with an IoT device that outputs periodic updates (e.g., outputs a sensor reading every 15 minutes), a mobile phone that sends emails or other messages relatively infrequently, etc. A "high" uptime may be associated with, for example, an autonomous vehicle that outputs sensor readings many times per second and/or receives instructions or processed feedback many times per second, a mobile phone that receives streaming content, etc. In practice, the traffic attributes may include additional or different attributes, and/or may be reflected in some other manner, such as raw throughput values over respective time windows, one or more scores, classifications or labels, and/or other suitable values.

Data structure 203 may include information indicating currently established PDU sessions and the respective network slices with which such PDU sessions are associated. FIG. 2 shows "PDU ID" as a simplified representation of identifiers based on which PDU sessions can be uniquely identified. In some embodiments, PCF 107 may maintain data structure 203 and/or may receive some or all of the information shown in data structure 203 from a UDM or some other suitable device or system that maintains and/or provides information correlating established PDU sessions to network slices.

As shown, PCF 107 may receive (at 202) traffic attributes associated with a particular PDU session. The traffic attributes may be determined or monitored by SMF 105 by communicating with a user plane traffic routing and/or processing element of the core network, such as a User Plane Function ("UPF"). For example, the UPF may provide a Session Report to SMF 105 via an N4 interface, indicating attributes, metrics, etc. of user plane traffic sent and/or received by the UPF via one or more respective PDU sessions. In some embodiments, PCF 107 may periodically or intermittently request the traffic attributes from SMF 105, such as by using a Npcf_SMPolicyControl_UpdateNotify message or some other suitable type of message. Additionally, or alternatively, PCF 107 may periodically or intermittently "push" the traffic attributes to PCF 107, such as via a Npcf_SMPolicyControl_Update message or some other suitable type of message. In some embodiments, SMF 105 and/or PCF 107 may receive such information from some other suitable source.

PCF 107, in accordance with some embodiments, may compare the traffic attributes, as received (at 202) from SMF 105, to the information in data structures 201 and 203 to determine whether the traffic attributes match the expected traffic attributes for the corresponding network slice. For example, PCF 107 may use data structure 203 to identify the network slice with which the PDU session is associated, and may use data structure 201 to identify whether the traffic attributes (received at 202) match the expected traffic attributes for that network slice. In order to determine whether the traffic attributes of the PDU session (referred to below as "actual" traffic attributes) "match" the expected traffic attributes (e.g., as indicated in data structure 201), PCF 107 may, for example, determine whether a throughput of the actual traffic attributes is below a threshold throughput specified in data structure 201 for that network slice. As another example, PCF 107 may determine whether an uptime of the actual traffic attributes is below a threshold uptime specified in data structure 201.

As yet another example, PCF 107 may determine, derive, calculate, etc. a signature, score, etc. of the actual traffic attributes, and may compare such signature, score, etc. to the expected traffic attributes as indicated in data structure 201. In such embodiments, PCF 107 may derive, calculate, etc. a signature, score, etc. of the expected traffic attributes as well, or data structure 201 may otherwise include such signature, score, etc. of the expected traffic attributes. In some embodiments, PCF 107 may perform some other suitable comparison, such as verifying that throughput, uptime, and/or other metrics are within a threshold range of corresponding attributes (e.g., throughput is not excessively too high or too low, etc.).

In this manner, PCF 107 may verify that the PDU session is being used in accordance with the expected traffic attributes for that slice. For example, a particular network slice may be devoted to gaming services, which may provide relatively low latency, and where gaming services may typically consume relatively low throughput. Situations may arise in which a given UE 103 or an application executing at UE 103 requests a slice associated with gaming services, but actually uses the slice for content streaming, which may consume relatively high throughput without needing or benefitting from low latency communications.

In such an example, or in other examples where the actual traffic attributes do not match the expected traffic attributes for a given network slice, PCF 107 may identify (at 204) a mismatch between the actual traffic attributes associated with a given PDU session and the expected traffic attributes for a network slice with which the PDU session is associated. PCF 107 may accordingly provide (at 206) an updated indication of a more appropriate network slice for the PDU session to SMF 105 (e.g., via a Npcf_SMPolicyControl_UpdateNotify message or some other suitable type of message). For example, PCF 107 may compare the actual traffic attributes to expected traffic attributes of other network slices (e.g., as included in data structure 201) in order to identify a network slice for which the expected traffic attributes more closely match the actual traffic attributes. In some embodiments, PCF 107 may use a suitable similarity analysis to identify a most similar (e.g., exhibiting a highest measure of similarity) set of expected traffic attributes to the actual traffic attributes, and may select a network slice with which the identified set of expected traffic attributes are associated. As similarly discussed above, once SMF 105 receives the indication of the updated network slice for the PDU session, SMF 105 may "move" the PDU session to another slice, which may include communicating with AMF 101, UE 103 with which the PDU session is associated, and/or one or more other devices or systems to tear down, de-establish, etc. the existing PDU session and establish a new PDU session, between the UE 103 and the core network, that is associated with the newly selected network slice.

FIG. 3 illustrates another example of the selection of a new network slice for a PDU session. In this example, PCF 107 may receive (at 302) an indication that a particular network slice is congested. PCF 107 may receive the indication from congestion monitoring system 301, which may monitor one or more core network elements (e.g., a UPF, SMF, etc.) to identify measures of load, congestion, etc. associated with such network elements. For example, congestion monitoring system 301 may identify that a relatively large amount of traffic is being sent via a given network slice, where such amount exceeds one or more thresholds (e.g., capacity thresholds) of a UPF or other network element associated with the given slice. Additionally, or alternatively, congestion monitoring system 301 may determine that QoS metrics, Service Level Agreement ("SLAs"), etc. associated with a given slice are not being met (or are below one or more thresholds). In some embodiments, congestion monitoring system 301 may determine some other type of congestion, outage, or other type of issue with a given network slice. Congestion monitoring system 301 may accordingly output (at 302) an indication to PCF 107 (e.g., via one or more APIs or other suitable communication pathways), indicating that the particular slice is congested. In some embodiments, the indication may indicate a degree to which the particular slice is congested (e.g., a total amount of user plane traffic sent or received via the given network slice, a total quantity of PDU sessions associated with the given network slice, etc.).

PCF 107 may accordingly select (at 304) one or more PDU sessions, associated with the particular network slice, to reassign to one or more different network slices. For example, PCF 107 may select a particular quantity of PDU sessions, associated with the particular network slice, in order to reduce the quantity of PDU sessions associated with the particular network slice to below a particular threshold quantity. For example, if the congestion information (received at 302) indicates that 1,000 PDU sessions are active on a given network slice, and further if a threshold associated with the given network slice is 980 PDU sessions, PCF 107 may select 20 PDU sessions to move to a different network slice. PCF 107 may, for example, randomly select such PDU sessions, or may select such PDU sessions based on one or more other criteria (e.g., a class or category associated with UEs 103 associated with the PDU sessions, amounts of traffic sent or received by UEs 103 associated with the PDU sessions, etc.).

As another example, PCF 107 may identify PDU sessions that exhibit actual traffic attributes that deviate the most from expected traffic attributes, and may move those PDU sessions to other network slices in situations where the particular network slice is congested. For example, if the particular network slice is a gaming network slice, PCF 107 may identify a particular set of PDU sessions that least conform to, match, etc. traffic attributes of the gaming network slice, and may select (at 304) such PDU sessions for moving to one or more other slices (e.g., slices for which expected traffic attributes more closely match the actual traffic attributes).

In practice, PCF 107 may utilize other techniques, factors, criteria, etc. to select which PDU sessions should be reassigned to different network slices. As shown, PCF 107 may provide (at 306) an updated indication to SMF 105 (e.g., via a Npcf_SMPolicyControl_UpdateNotify message or some other suitable type of message), indicating which PDU sessions should be moved to which slices. As similarly discussed above, SMF 105, UE 103, AMF 101, and/or one or more other devices or systems may communicate with each other in order to move (e.g., de-establish and re-establish) the selected PDU sessions to different network slices.

Figure 4:
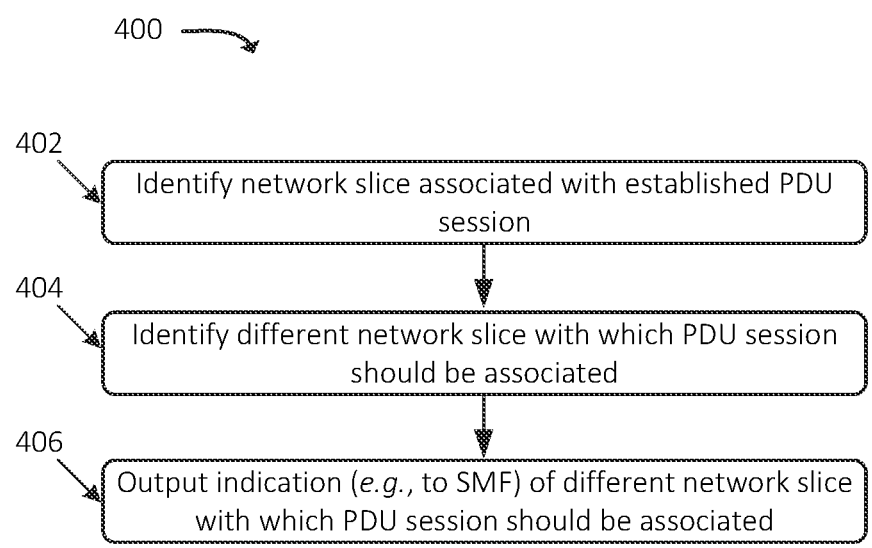
FIG. 4 illustrates an example process for moving a communication session, between a UE and a core network, from one network slice to another, in accordance with some embodiments.

FIG. 4 illustrates an example process 400 for moving a communication session, between a UE and a core network, from one network slice to another. In some embodiments, some or all of process 400 may be performed by PCF 107. In some embodiments, one or more other devices may perform some or all of process 400 in concert with, and/or in lieu of, PCF 107.

As shown, process 400 may include identifying (at 402) a network slice associated with an established communication session (e.g., a PDU session). For example, as discussed above, PCF 107 may receive such information from SMF 105 and/or from some other source. The information may include a PDU session identifier, a network slice identifier, a UE identifier, and/or other suitable information. In some embodiments, PCF 107 may receive the indication via an N7 interface, a Npcf_SMPolicyControl message, and/or in some other suitable manner. In some embodiments, PCF 107 may receive the indication as part of the session establishment procedure, or may receive the indication after the session has been established between UE 103 and the core network (e.g., between UE 103 and a UPF or other device or system of the core network).

Process 400 may further include identifying (at 404) a different network slice with which the communication session (e.g., PDU session) should be associated. For example, as discussed above, PCF 107 may maintain rules, criteria, etc. indicating expected user plane traffic attributes for one or more network slices, and may also request and/or receive actual user plane traffic associated with the established communication session. In the event that PCF 107 detects a mismatch (e.g., a deviation beyond a threshold) between the actual and expected traffic attributes, PCF 107 may determine a more suitable network slice (e.g., a network slice for which expected user plane traffic attributes more closely match the actual traffic attributes, or a "default" or "best effort" slice in some situations). As another example, PCF 107 may receive an indication that one or more network slices are congested, and may identify particular communication sessions that should be moved based on the indication of congestion. In some embodiments, PCF 107 may determine the different network slice for the communication session based on one or more other criteria, factors, conditions, etc. Additionally, or alternatively, PCF 107 may receive, from some other device or system, an instruction to move the communication session to the different network slice.

Process 400 may additionally include outputting (at 406) an indication (e.g., to a SMF 105 or other session control element) of the identified different network slice with which the PDU session should be associated. For example, PCF 107 may provide such indication via an N7 interface, via an Npcf_SMPolicyControl message, and/or in some other suitable manner. As discussed above, SMF 105 may cause the PDU session to be moved, which may include tearing down, de-establishing, etc. the previously established PDU session and establishing a new PDU session between the same UE 103 and the core network, via the identified different network slice.

Figure 5:
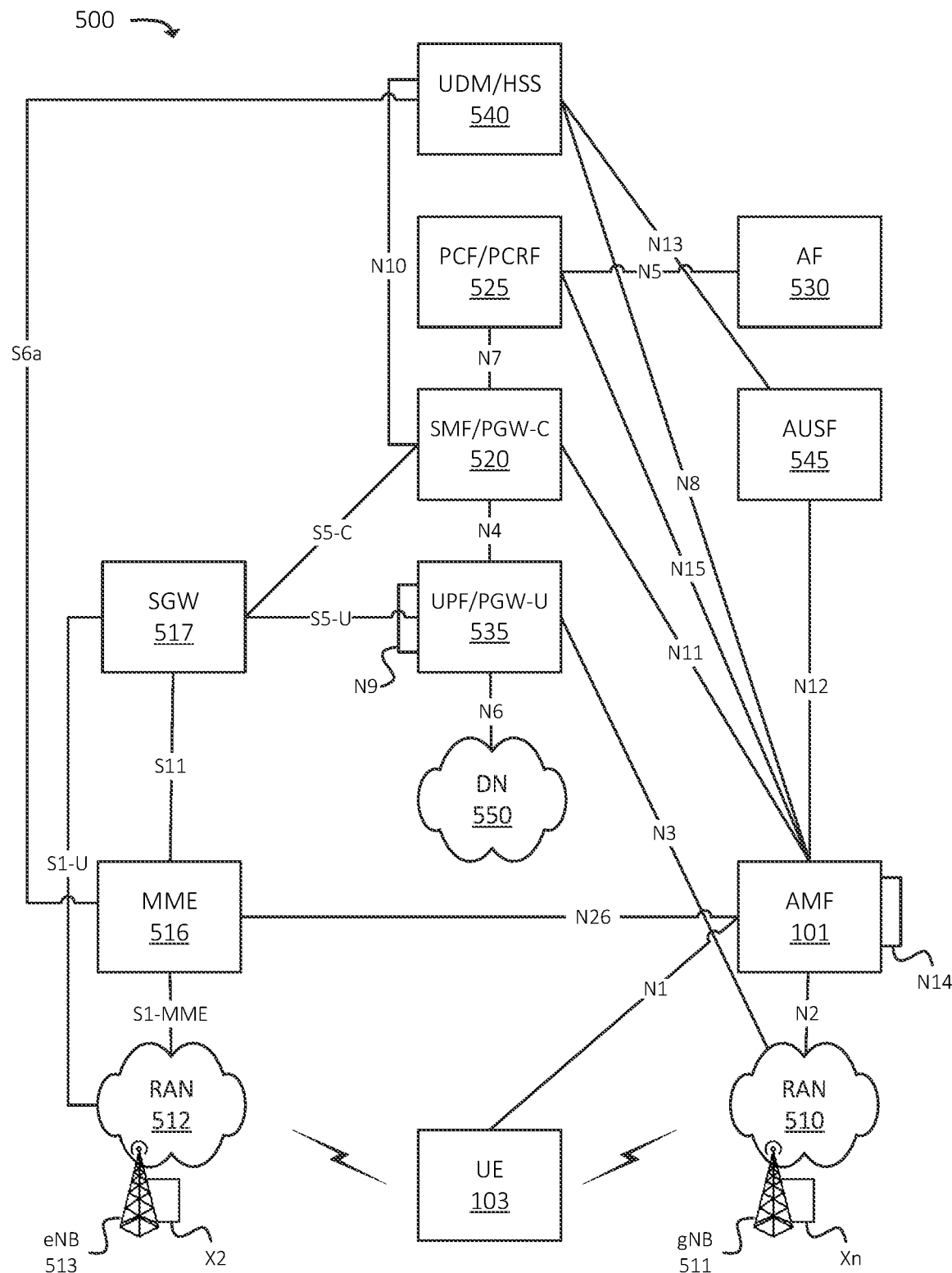
FIG. 5 illustrates an example environment in which one or more embodiments, described herein, may be implemented.

FIG. 5 illustrates an example environment 500, in which one or more embodiments may be implemented. In some embodiments, environment 500 may correspond to a 5G network, and/or may include elements of a 5G network. In some embodiments, environment 500 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 500 may represent or may include a 5GC. As shown, environment 500 may include UE 103, RAN 510 (which may include one or more Next Generation Node Bs ("gNBs") 511), RAN 512 (which may include one or more evolved Node Bs ("eNBs") 513), and various network functions such as AMF 101, Mobility Management Entity ("MME") 516, Serving Gateway ("SGW") 517, SMF/Packet Data Network ("PDN") Gateway ("PGW")-Control plane function ("PGW-C") 520, PCF/Policy Charging and Rules Function ("PCRF") 525, Application Function ("AF") 530, UPF/PGW-User plane function ("PGW-U") 535, UDM/Home Subscriber Server ("HSS") 540, and Authentication Server Function ("AUSF") 545. Environment 500 may also include one or more networks, such as Data Network ("DN") 550. Environment 500 may include one or more additional devices or systems communicatively coupled to one or more networks (e.g., DN 550).

The example shown in FIG. 5 illustrates one instance of each network component or function (e.g., one instance of SMF/PGW-C 520, PCF/PCRF 525, UPF/PGW-U 535, UDM/HSS 540, and/or AUSF 545). In practice, environment 500 may include multiple instances of such components or functions. For example, in some embodiments, environment 500 may include multiple "slices" of a core network, where each slice includes a discrete and/or logical set of network functions (e.g., one slice may include a first instance of SMF/PGW-C 520, PCF/PCRF 525, UPF/PGW-U 535, UDM/HSS 540, and/or AUSF 545, while another slice may include a second instance of SMF/PGW-C 520, PCF/PCRF 525, UPF/PGW-U 535, UDM/HSS 540, and/or AUSF 545). The different slices may provide differentiated levels of service, such as service in accordance with different Quality of Service ("QoS") parameters.

The quantity of devices and/or networks, illustrated in FIG. 5, is provided for explanatory purposes only. In practice, environment 500 may include additional devices and/or networks, fewer devices and/or networks, different devices and/or networks, or differently arranged devices and/or networks than illustrated in FIG. 5. For example, while not shown, environment 500 may include devices that facilitate or enable communication between various components shown in environment 500, such as routers, modems, gateways, switches, hubs, etc. Alternatively, or additionally, one or more of the devices of environment 500 may perform one or more network functions described as being performed by another one or more of the devices of environment 500. Devices of environment 500 may interconnect with each other and/or other devices via wired connections, wireless connections, or a combination of wired and wireless connections. In some implementations, one or more devices of environment 500 may be physically integrated in, and/or may be physically attached to, one or more other devices of environment 500.

UE 103 may include a computation and communication device, such as a wireless mobile communication device that is capable of communicating with RAN 510, RAN 512, and/or DN 550. UE 103 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 103 may send traffic to and/or receive traffic (e.g., user plane traffic) from DN 550 via RAN 510, RAN 512, and/or UPF/PGW-U 535.

RAN 510 may be, or may include, a 5G RAN that includes one or more base stations (e.g., one or more gNBs 511), via which UE 103 may communicate with one or more other elements of environment 500. UE 103 may communicate with RAN 510 via an air interface (e.g., as provided by gNB 511). For instance, RAN 510 may receive traffic (e.g., voice call traffic, data traffic, messaging traffic, signaling traffic, etc.) from UE 103 via the air interface, and may communicate the traffic to UPF/PGW-U 535, and/or one or more other devices or networks. Similarly, RAN 510 may receive traffic intended for UE 103 (e.g., from UPF/PGW-U 535, AMF 101, and/or one or more other devices or networks) and may communicate the traffic to UE 103 via the air interface.

RAN 512 may be, or may include, a LTE RAN that includes one or more base stations (e.g., one or more eNBs 513), via which UE 103 may communicate with one or more other elements of environment 500. UE 103 may communicate with RAN 512 via an air interface (e.g., as provided by eNB 513). For instance, RAN 512 may receive traffic (e.g., voice call traffic, data traffic, messaging traffic, signaling traffic, etc.) from UE 103 via the air interface, and may communicate the traffic to UPF/PGW-U 535, and/or one or more other devices or networks. Similarly, RAN 512 may receive traffic intended for UE 103 (e.g., from UPF/PGW-U 535, SGW 517, and/or one or more other devices or networks) and may communicate the traffic to UE 103 via the air interface.

AMF 101 may include one or more devices, systems, Virtualized Network Functions ("VNFs"), Cloud-Native Network Functions ("CNFs"), etc., that perform operations to register UE 103 with the 5G network, to establish bearer channels associated with a session with UE 103, to hand off UE 103 from the 5G network to another network, to hand off UE 103 from the other network to the 5G network, manage mobility of UE 103 between RANs 510 and/or gNBs 511, and/or to perform other operations. In some embodiments, the 5G network may include multiple AMFs 101, which communicate with each other via the N14 interface (denoted in FIG. 5 by the line marked "N14" originating and terminating at AMF 101).

MME 516 may include one or more devices, systems, VNFs, CNFs, etc., that perform operations to register UE 103 with the EPC, to establish bearer channels associated with a session with UE 103, to hand off UE 103 from the EPC to another network, to hand off UE 103 from another network to the EPC, manage mobility of UE 103 between RANs 512 and/or eNBs 513, and/or to perform other operations.

SGW 517 may include one or more devices, systems, VNFs, CNFs, etc., that aggregate traffic received from one or more eNBs 513 and send the aggregated traffic to an external network or device via UPF/PGW-U 535. Additionally, SGW 517 may aggregate traffic received from one or more UPF/PGW-Us 535 and may send the aggregated traffic to one or more eNBs 513. SGW 517 may operate as an anchor for the user plane during inter-eNB handovers and as an anchor for mobility between different telecommunication networks or RANs (e.g., RANs 510 and 512).

SMF/PGW-C 520 may include one or more devices, systems, VNFs, CNFs, etc., that gather, process, store, and/or provide information in a manner described herein. SMF/PGW-C 520 may, for example, facilitate the establishment of communication sessions on behalf of UE 103. In some embodiments, the establishment of communications sessions may be performed in accordance with one or more policies provided by PCF/PCRF 525. In some embodiments, SMF/PGW-C 520 may be, may include, may be communicatively coupled to, may be implemented by, and/or may otherwise be associated with SMF 105.

PCF/PCRF 525 may include one or more devices, systems, VNFs, CNFs, etc., that aggregate information to and from the 5G network and/or other sources. PCF/PCRF 525 may receive information regarding policies and/or subscriptions from one or more sources, such as subscriber databases and/or from one or more users (such as, for example, an administrator associated with PCF/PCRF 525). In some embodiments, PCF/PCRF 525 may be, may include, may be communicatively coupled to, may be implemented by, and/or may otherwise be associated with PCF 107.

AF 530 may include one or more devices, systems, VNFs, CNFs, etc., that receive, store, and/or provide information that may be used in determining parameters (e.g., quality of service parameters, charging parameters, or the like) for certain applications.

UPF/PGW-U 535 may include one or more devices, systems, VNFs, CNFs, etc., that receive, store, and/or provide data (e.g., user plane data). For example, UPF/PGW-U 535 may receive user plane data (e.g., voice call traffic, data traffic, etc.), destined for UE 103, from DN 550, and may forward the user plane data toward UE 103 (e.g., via RAN 510, SMF/PGW-C 520, and/or one or more other devices). In some embodiments, multiple UPFs 535 may be deployed (e.g., in different geographical locations), and the delivery of content to UE 103 may be coordinated via the N9 interface (e.g., as denoted in FIG. 5 by the line marked "N9" originating and terminating at UPF/PGW-U 535). Similarly, UPF/PGW-U 535 may receive traffic from UE 103 (e.g., via RAN 510, SMF/PGW-C 520, and/or one or more other devices), and may forward the traffic toward DN 550. In some embodiments, UPF/PGW-U 535 may communicate (e.g., via the N4 interface) with SMF/PGW-C 520, regarding user plane data processed by UPF/PGW-U 535.

UDM/HSS 540 and AUSF 545 may include one or more devices, systems, VNFs, CNFs, etc., that manage, update, and/or store, in one or more memory devices associated with AUSF 545 and/or UDM/HSS 540, profile information associated with a subscriber. AUSF 545 and/or UDM/HSS 540 may perform authentication, authorization, and/or accounting operations associated with the subscriber and/or a communication session with UE 103.

DN 550 may include one or more wired and/or wireless networks. For example, DN 550 may include an Internet Protocol ("IP")-based PDN, a wide area network ("WAN") such as the Internet, a private enterprise network, and/or one or more other networks. UE 103 may communicate, through DN 550, with data servers, other UEs 103, and/or to other servers or applications that are coupled to DN 550. DN 550 may be connected to one or more other networks, such as a public switched telephone network ("PSTN"), a public land mobile network ("PLMN"), and/or another network. DN 550 may be connected to one or more devices, such as content providers, applications, web servers, and/or other devices, with which UE 103 may communicate.

Figure 6:
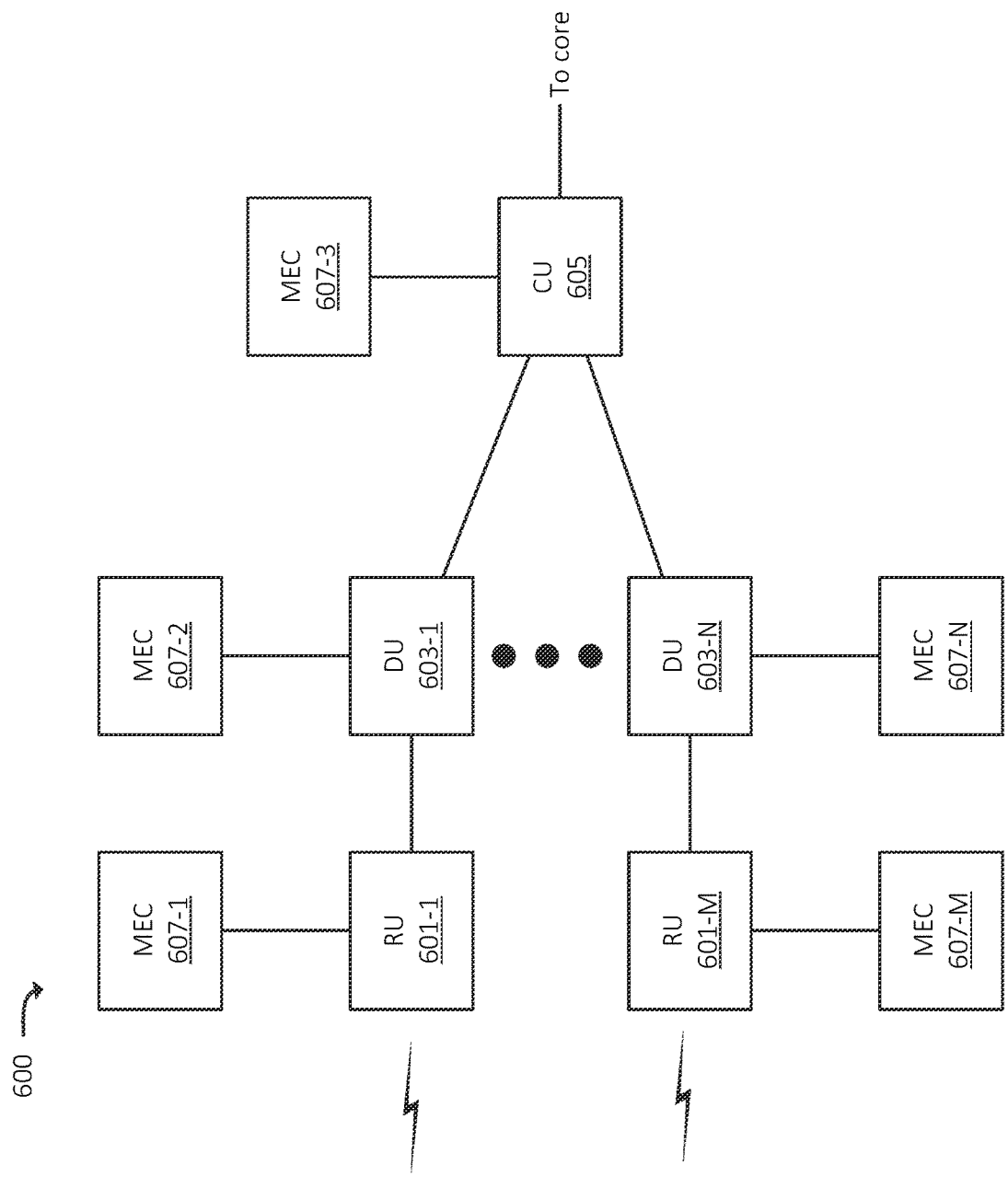
FIG. 6 illustrates an example arrangement of a radio access network ("RAN"), in accordance with some embodiments.

FIG. 6 illustrates an example Distributed Unit ("DU") network 600, which may be included in and/or implemented by one or more RANs (e.g., RAN 510, RAN 512, or some other RAN). In some embodiments, a particular RAN may include one DU network 600. In some embodiments, a particular RAN may include multiple DU networks 600. In some embodiments, DU network 600 may correspond to a particular gNB 511 of a 5G RAN (e.g., RAN 510). In some embodiments, DU network 600 may correspond to multiple gNBs 511. In some embodiments, DU network 600 may correspond to one or more other types of base stations of one or more other types of RANs. As shown, DU network 600 may include Central Unit ("CU") 605, one or more Distributed Units ("DUs") 603-1 through 603-N (referred to individually as "DU 603," or collectively as "DUs 603"), and one or more Radio Units ("RUs") 601-1 through 601-M (referred to individually as "RU 601," or collectively as "RUs 601").

CU 605 may communicate with a core of a wireless network (e.g., may communicate with one or more of the devices or systems described above with respect to FIG. 5, such as AMF 101 and/or UPF/PGW-U 535). In the uplink direction (e.g., for traffic from UEs 103 to a core network), CU 605 may aggregate traffic from DUs 603, and forward the aggregated traffic to the core network. In some embodiments, CU 605 may receive traffic according to a given protocol (e.g., Radio Link Control ("RLC")) from DUs 603, and may perform higher-layer processing (e.g., may aggregate/process RLC packets and generate Packet Data Convergence Protocol ("PDCP") packets based on the RLC packets) on the traffic received from DUs 603.

In accordance with some embodiments, CU 605 may receive downlink traffic (e.g., traffic from the core network) for a particular UE 103, and may determine which DU(s) 603 should receive the downlink traffic. DU 603 may include one or more devices that transmit traffic between a core network (e.g., via CU 605) and UE 103 (e.g., via a respective RU 601). DU 603 may, for example, receive traffic from RU 601 at a first layer (e.g., physical ("PHY") layer traffic, or lower PHY layer traffic), and may process/ aggregate the traffic to a second layer (e.g., upper PHY and/or RLC). DU 603 may receive traffic from CU 605 at the second layer, may process the traffic to the first layer, and provide the processed traffic to a respective RU 601 for transmission to UE 103.

RU 601 may include hardware circuitry (e.g., one or more RF transceivers, antennas, radios, and/or other suitable hardware) to communicate wirelessly (e.g., via an RF interface) with one or more UEs 103, one or more other DUs 603 (e.g., via RUs 601 associated with DUs 603), and/or any other suitable type of device. In the uplink direction, RU 601 may receive traffic from UE 103 and/or another DU 603 via the RF interface and may provide the traffic to DU 603. In the downlink direction, RU 601 may receive traffic from DU 603, and may provide the traffic to UE 103 and/or another DU 603.

RUs 601 may, in some embodiments, be communicatively coupled to one or more Multi-Access/Mobile Edge Computing ("MEC") devices, referred to sometimes herein simply as "MECs" 607. For example, RU 601-1 may be communicatively coupled to MEC 607-1, RU 601-M may be communicatively coupled to MEC 607-M, DU 603-1 may be communicatively coupled to MEC 607-2, DU 603-N may be communicatively coupled to MEC 607-N, CU 605 may be communicatively coupled to MEC 607-3, and so on. MECs 607 may include hardware resources (e.g., configurable or provisionable hardware resources) that may be configured to provide services and/or otherwise process traffic to and/or from UE 103, via a respective RU 601.

For example, RU 601-1 may route some traffic, from UE 103, to MEC 607-1 instead of to a core network via DU 603 and CU 605. MEC 607-1 may process the traffic, perform one or more computations based on the received traffic, and may provide traffic to UE 103 via RU 601-1. In some embodiments, MEC 607 may include, and/or may implement, some or all of the functionality described above with respect to AF 530, UPF 535, and/or one or more other devices, systems, VNFs, CNFs, etc. In this manner, ultra-low latency services may be provided to UE 103, as traffic does not need to traverse DU 603, CU 605, and an intervening backhaul network between DU network 600 and the core network.

Figure 7:
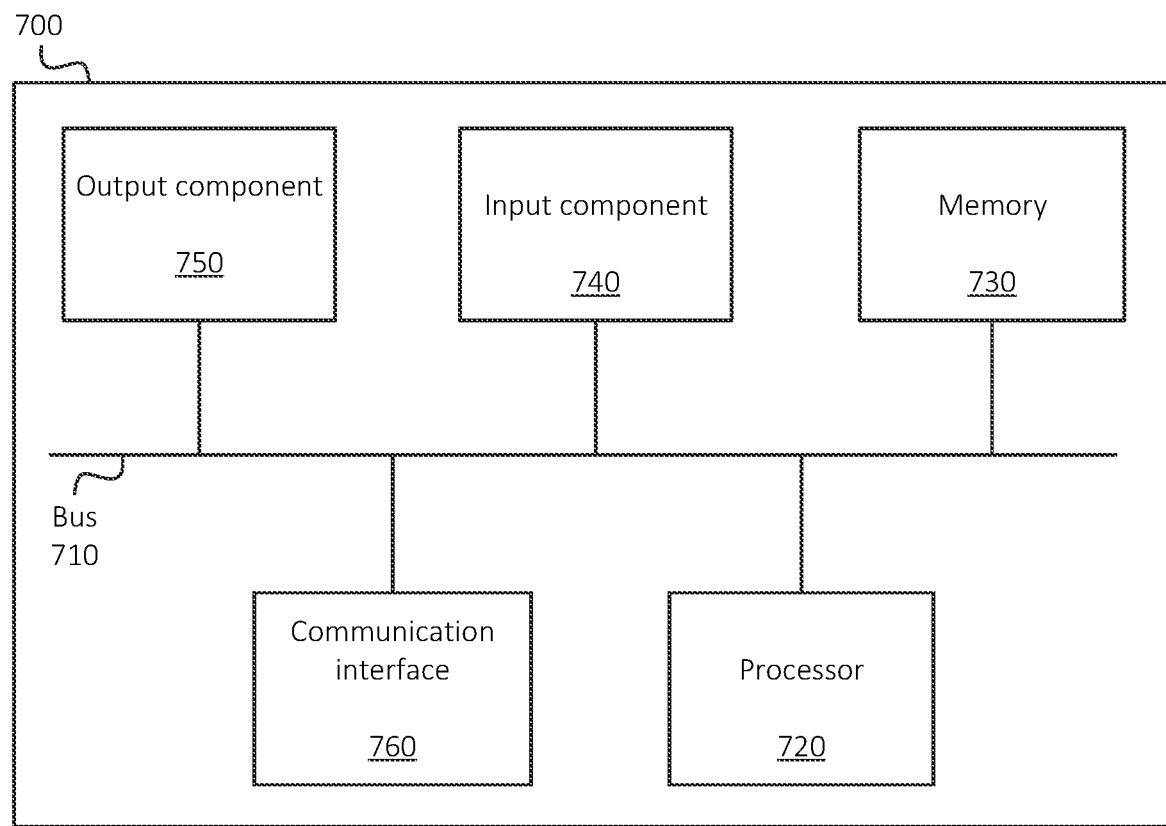
FIG. 7 illustrates example components of one or more devices, in accordance with one or more embodiments described herein.

FIG. 7 illustrates example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. In some embodiments, processor 720 may be or may include one or more hardware processors. Memory 730 may include any type of dynamic storage device that may store information and instructions for execution by processor 720, and/or any type of non-volatile storage device that may store information for use by processor 720.

Input component 740 may include a mechanism that permits an operator to input information to device 700 and/or other receives or detects input from a source external to 740, such as a touchpad, a touchscreen, a keyboard, a keypad, a button, a switch, a microphone or other audio input component, etc. In some embodiments, input component 740 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
one or more processors configured to:
identify a first network slice with which a plurality of communication sessions, between a plurality of User Equipment ("UEs") and a core network, are associated;
determine that a quantity of communication sessions, associated with the first network slice, exceeds a threshold quantity of communication sessions;
select one or more communication sessions, of the plurality of communication sessions;
identify a second network slice with which the selected one or more communication sessions should be associated; and output an indication to a session control element associated with the core network, wherein the indication includes an identifier of the second network slice, wherein the session control element causes the selected one or more communication sessions to be moved from the first network slice to the second network slice based on receiving the indication.

2. The device of claim 1, wherein the session control element includes a Session Management Function ("SMF").

3. The device of claim 1, wherein identifying the first network slice includes receiving at least one of an Npcf_SMPolicyControl_Create message or an Npcf_SMPolicyControl_Update message that includes an indication of the first network slice.

4. The device of claim 1, wherein outputting the indication includes outputting a Npcf_SMPolicyControl_UpdateNotify message to the session control element.

5. The device of claim 1, wherein the one or more processors are further configured to:
receive actual traffic attributes associated with communications sent via the selected one or more communication sessions;
compare the actual traffic attributes to expected traffic attributes associated with the first network slice; and
determine, based on the comparing, a mismatch between the actual traffic attributes and the expected traffic attributes, wherein identifying the second network slice is performed based on determining the mismatch between the actual traffic attributes and the expected traffic attributes.

6. The device of claim 5, wherein the actual traffic attributes are based on one or more reports provided by a User Plane Function ("UPF") that communicates with the UE via the communication session.

7. The device of claim 1, wherein the one or more processors are further configured to:
receive actual traffic attributes associated with communications sent via the plurality of communication sessions;
compare the actual traffic attributes to expected traffic attributes associated with the first network slice; and
determine, based on the comparing, a mismatch between actual traffic attributes associated with the one or more communication sessions and the expected traffic attributes, wherein selecting the one or more communication sessions is performed based on determining the mismatch between the actual traffic attributes associated with the one or more communication sessions and the expected traffic attributes.

8. A non-transitory computer-readable medium, storing a plurality of processor-executable instructions to:
identify a first network slice with which a plurality of communication sessions, between a plurality of User Equipment ("UEs") and a core network, are associated;
determine that a quantity of communication sessions, associated with the first network slice, exceeds a threshold quantity of communication sessions;
select one or more communication sessions, of the plurality of communication sessions;
identify a second network slice with which the selected one or more communication sessions should be associated; and
output an indication to a session control element associated with the core network, wherein the indication includes an identifier of the second network slice, wherein the session control element causes the selected one or more communication sessions to be moved from the first network slice to the second network slice based on receiving the indication.

9. The non-transitory computer-readable medium of claim 8, wherein the session control element includes a Session Management Function ("SMF").

10. The non-transitory computer-readable medium of claim 8, wherein identifying the first network slice includes receiving at least one of an Npcf_SMPolicyControl_Create message or an Npcf_SMPolicyControl_Update message that includes an indication of the first network slice.

11. The non-transitory computer-readable medium of claim 8, wherein outputting the indication includes outputting a Npcf_SMPolicyControl_UpdateNotify message to the session control element.

12. The non-transitory computer-readable medium of claim 8, wherein the plurality of processor-executable instructions further include processor-executable instructions to:
receive actual traffic attributes associated with communications sent via the selected one or more communication sessions;
compare the actual traffic attributes to expected traffic attributes associated with the first network slice; and
determine, based on the comparing, a mismatch between the actual traffic attributes and the expected traffic attributes, wherein identifying the second network slice is performed based on determining the mismatch between the actual traffic attributes and the expected traffic attributes.

13. The non-transitory computer-readable medium of claim 12, wherein the actual traffic attributes are based on one or more reports provided by a User Plane Function ("UPF") that communicates with the UE via the communication session.

14. The non-transitory computer-readable medium of claim 8, wherein the communication session includes a protocol data unit ("PDU") session.

15. A method, comprising:
identifying a first network slice with which a plurality of communication sessions, between a plurality of User Equipment ("UEs") and a core network, are associated;
determining that a quantity of communication sessions, associated with the first network slice, exceeds a threshold quantity of communication sessions;
selecting one or more communication sessions, of the plurality of communication sessions;
identifying a second network slice with which the selected one or more communication sessions should be associated; and
outputting an indication to a session control element associated with the core network, wherein the indication includes an identifier of the second network slice, wherein the session control element causes the selected one or more communication sessions to be moved from the first network slice to the second network slice based on receiving the indication.

16. The method of claim 15, wherein the session control element includes a Session Management Function ("SMF").

17. The method of claim 15, wherein identifying the first network slice includes receiving at least one of an Npcf_SMPolicyControl_Create message or an Npcf_SMPolicyControl_Update message that includes an indication of the first network slice, and wherein outputting the indication includes outputting a Npcf_SMPolicyControl_UpdateNotify message to the session control element.

18. The method of claim 15, further comprising:
receiving actual traffic attributes associated with communications sent via the selected one or more communication sessions;
comparing the actual traffic attributes to expected traffic attributes associated with the first network slice; and
determining, based on the comparing, a mismatch between the actual traffic attributes and the expected traffic attributes, wherein identifying the second network slice is performed based on determining the mismatch between the actual traffic attributes and the expected traffic attributes.

19. The method of claim 18, wherein the actual traffic attributes are based on one or more reports provided by a User Plane Function ("UPF") that communicates with the UE via the communication session.

20. The method of claim 15, wherein the communication session includes a protocol data unit ("PDU") session.

* * * * *